(12) United States Patent
Okuyama

(10) Patent No.: US 11,833,679 B2
(45) Date of Patent: Dec. 5, 2023

(54) TEACHING CONTROL METHOD FOR ROBOT AND ROBOT SYSTEM

(71) Applicant: SEIKO EPSON CORPORATION, Tokyo (JP)

(72) Inventor: Masayuki Okuyama, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 230 days.

(21) Appl. No.: 17/381,224

(22) Filed: Jul. 21, 2021

(65) Prior Publication Data

US 2022/0024028 A1    Jan. 27, 2022

(30) Foreign Application Priority Data

Jul. 22, 2020   (JP) ................................ 2020-125032

(51) Int. Cl.
  *B25J 9/16*    (2006.01)
  *B25J 9/00*    (2006.01)

(52) U.S. Cl.
  CPC ........... *B25J 9/0081* (2013.01); *B25J 9/1633* (2013.01); *B25J 9/1671* (2013.01)

(58) Field of Classification Search
  CPC ...... B25J 9/0081; B25J 9/1633; B25J 9/1671; G05B 19/425; G05B 19/40123
  USPC ................ 700/259, 264; 318/568.13; 901/42
  See application file for complete search history.

(56) References Cited

U.S. PATENT DOCUMENTS 6,256,552 B1    7/2001  Aoki et al.
9,311,608 B2 *  4/2016  Kuwahara .............. B25J 9/1684
10,780,577 B2 *  9/2020  Murakami ............... G06N 3/08
11,241,759 B2 *  2/2022  Takeda ................ G05B 19/4155
2006/0212170 A1 *  9/2006  Nagatsuka ......... G05B 19/4207
                                                    700/245
2015/0045949 A1    2/2015  Hashiguchi et al.
2019/0275675 A1 *  9/2019  Seno ....................... G05B 19/02
2019/0321983 A1 * 10/2019  Chen ..................... B25J 9/1656

FOREIGN PATENT DOCUMENTS

| CN | 105643399 A | 6/2016 |
| CN | 110355759 A | 10/2019 |
| JP | H11085241 A | 3/1999 |
| JP | 2007136588 A | 6/2007 |
| JP | 2010205215 A | 9/2010 |
| JP | 2015033745 A | 2/2015 |

OTHER PUBLICATIONS

Search Report of the First Office Action CN Application No. 2021108205705 dated Apr. 14, 2023.

* cited by examiner

*Primary Examiner* — Dalena Tran
(74) *Attorney, Agent, or Firm* — Yu Gang

(57) ABSTRACT

A teaching control method includes acquiring a plurality of teaching points from CAD data of a work target object and displaying the plurality of teaching points on a display section, acquiring a result of classification processing for classifying the plurality of teaching points into one or more teaching point groups, receiving an operation parameter for each teaching point group, and setting an operation value for each teaching point group using the operation parameter. The classification processing for classifying the plurality of teaching points into the teaching point groups is executed using attribute information of the work target object obtained from the CAD data.

5 Claims, 13 Drawing Sheets

TEACHING CONTROL METHOD FOR ROBOT AND ROBOT SYSTEM

The present application is based on, and claims priority from JP Application Serial Number 2020-125032, filed Jul. 22, 2020, the disclosure of which is hereby incorporated by reference herein in its entirety.

BACKGROUND

1. Technical Field

The present disclosure relates to a teaching control method for a robot and a robot system.

2. Related Art

JP-A-2007-136588 (Patent Literature 1) discloses a method of, when creating an operation program for causing a robot to perform work including force control, setting an operation value concerning the force control for each teaching point.

However, the operation program includes a large number of teaching points. An operator has to individually set operation values concerning the force control for the respective teaching points. Therefore, teaching work is complicated. Such a problem also occurs when other operation values such as speed and acceleration are set for a plurality of teaching points.

SUMMARY

According to a first aspect of the present disclosure, there is provided a teaching control method for creating an operation program for a robot that executes work for a work target object. The teaching control method includes: (a) acquiring a plurality of teaching points from CAD data of the work target object; (b) displaying the plurality of teaching points on a display section; (c) acquiring a result of classification processing for classifying the plurality of teaching points into one or more teaching point groups; (d) receiving an operation parameter used to set an operation value for each teaching point group among the one or more teaching point groups; and (e) setting the operation value for each teaching point group using the operation parameter. The acquiring of the result of the classification processing (c) includes: (i) acquiring attribute information of the work target object acquired from the CAD data, the attribute information being attribute information at the plurality of teaching points; and (ii) executing the classification processing using the attribute information.

According to a second aspect of the present disclosure, there is provided a robot system. The robot system includes: a robot configured to execute work for a work target object; a control section configured to control the robot; and a display section coupled to the control section. The control section executes: (a) processing for acquiring a plurality of teaching points from CAD data of the work target object; (b) processing for displaying the plurality of teaching points on the display section; (c) processing for executing processing for acquiring a result of classification processing for classifying the plurality of teaching points into one or more teaching point groups; (d) processing for acquiring an operation parameter used to set an operation value for each teaching point group among the one or more teaching point groups; and (e) processing for setting the operation value for each teaching point group using the operation parameter. The processing (c) includes: (i) processing for acquiring attribute information of the work target object acquired from the CAD data, the attribute information being attribute information at the plurality of teaching points; and (ii) processing for executing the classification processing using the attribute information.

According to a third aspect of the present disclosure, there is provided a non-transitory computer-readable storage medium storing a computer program for causing a processor to execute teaching control for a robot that executes work for a work target object. The computer program causes the processor to execute: (a) processing for acquiring a plurality of teaching points from CAD data of the work target object; (b) processing for displaying the plurality of teaching points on a display section; (c) processing for executing processing for acquiring a result of classification processing for classifying the plurality of teaching points into one or more teaching point groups; (d) processing for acquiring an operation parameter used to set an operation value for each teaching point group among the one or more teaching point groups; and (e) processing for setting the operation value for each teaching point group using the operation parameter. The processing (c) includes: (i) processing for acquiring attribute information of the work target object acquired from the CAD data, the attribute information being attribute information at the plurality of teaching points; and (ii) processing for executing the classification processing using the attribute information.

DESCRIPTION OF EXEMPLARY EMBODIMENTS

A. First Embodiment

Figure 1:
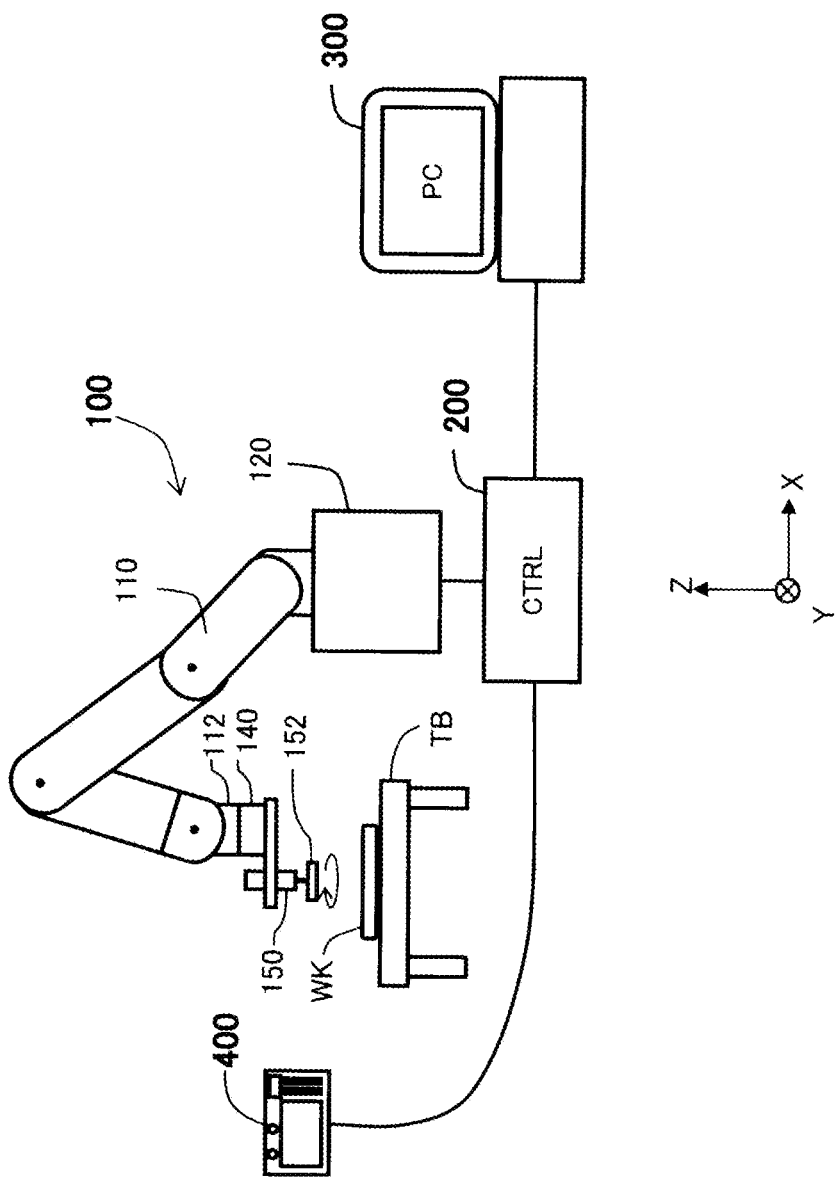
FIG. 1 is an explanatory diagram of a configuration example of a robot system in a first embodiment.

FIG. 1 is an explanatory diagram showing an example of a robot system in a first embodiment. The robot system includes a robot 100, a control device 200 that controls the robot 100, a personal computer 300, a teaching pendant 400. In FIG. 1, three directions X, Y, and Z perpendicular to one another are shown. The X direction and the Y direction are the horizontal direction. The Z direction is the vertical direction. These directions are illustrated in the other figures as well according to necessity.

The robot 100 includes an arm 110 and a base 120. The arm 110 is coupled by six joints in order. A force detecting section 140 and an end effector 150 are attached to an arm end 112, which is the distal end portion of the arm 110. In this embodiment, a polishing device is used as the end effector 150. A rotating body 152 attached with a polishing material is provided at the distal end of the end effector 150. The rotating body 152 is obtained by attaching a disc-like polishing material to a spindle. However, any end effector other than the polishing device can be used. A workpiece WK, which is a work target object of the robot 100, is set on a table TB. In this embodiment, a six-axis robot is illustrated. However, a robot including any arm mechanism including one or more joints can be used. The robot 100 in this embodiment is a vertical articulated robot. However, a horizontal articulated robot may be used.

The force detecting section 140 is a six-axis force sensor that measures an external force applied to the end effector 150. The force detecting section 140 includes three detection axes orthogonal to one another in a sensor coordinate system, which is a peculiar coordinate system, and detects the magnitude of force parallel to each detection axis and the magnitude of torque (moment of force) around each detection axis. The force parallel to each detection axis is referred to as "translational force". The torque around each detection axis is referred to as "rotational force". In this specification, the term "force" is used as meaning including both of the translational force and the rotational force.

The force detecting section 140 does not need to be the sensor that detects forces of six axes. A sensor that detects forces in a smaller number of directions may be used. Instead of providing the force detecting section 140 at the distal end of the arm 110, a force sensor functioning as a force detecting section may be provided in any one or more joints of the arm 110. The "force detecting section" only has to have a function of detecting force. That is, the "force detecting section" may be a device that directly detects force like a force sensor or may be a device that indirectly calculates force like an IMU (Inertial Measurement Unit) and a device that detects force from a current value of an actuator of the arm 110. The "force detecting section" may be externally attached to the robot 100 or may be incorporated in the robot 100.

The workpiece WK is polished by the rotating body 152 provided at the distal end of the end projector 150. During the polishing, the arm 110 is controlled such that force detected by the force detecting section 140 reaches a target force set in advance. This polishing work is work performed by force control based on an output of the force detecting section 140. However, the present disclosure is also applicable to work not involving force control.

Figure 2:
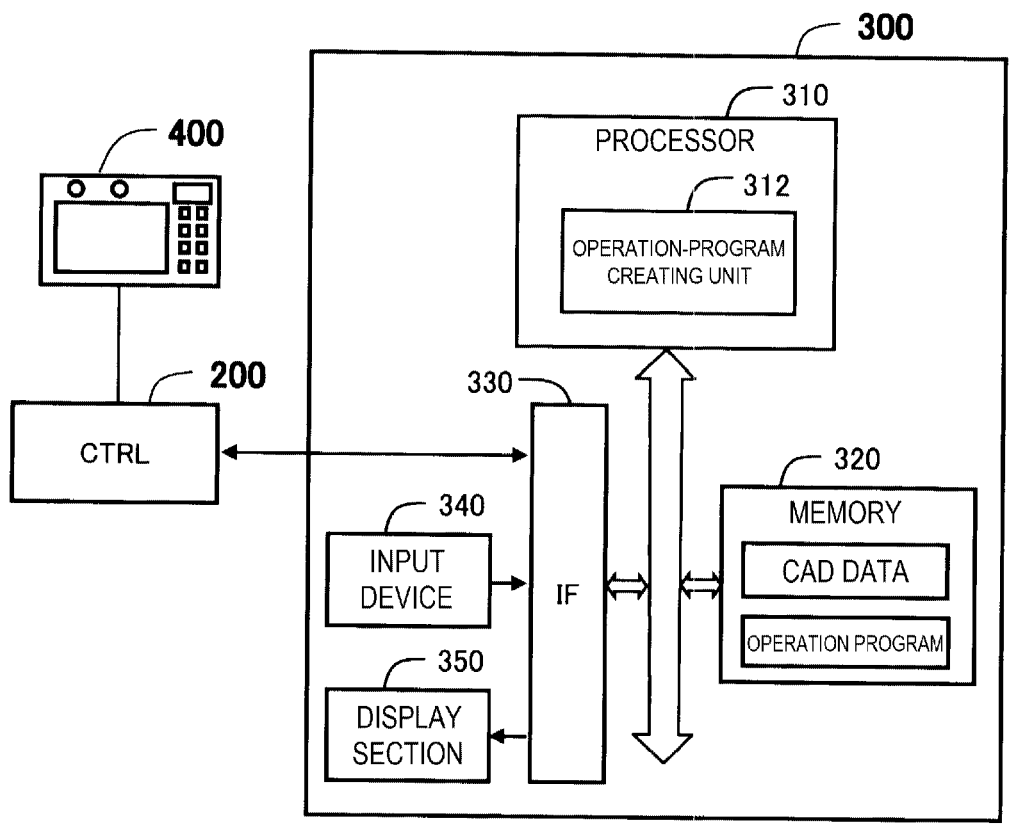
FIG. 2 is a functional block diagram of a personal computer.

FIG. 2 is a block diagram showing functions of the personal computer 300. The personal computer 300 includes a processor 310, a memory 320, an interface circuit 330, and an input device 340 and a display section 350 coupled to the interface circuit 330. The interface circuit 330 is coupled to the control device 200. The teaching pendant 400 is coupled to the control device 200.

The processor 310 functions as an operation-program creating section 312 that creates an operation program for the robot 100. The operation-program creating section 312 has a function of creating an operation program according to an instruction of an operator. The operation-program creating section 312 preferably further includes a simulator function for simulating the operation of the robot 100 according to the created operation program. The operation-program creating section 312 is realized by the processor 310 executing a computer program stored in the memory 320. However, the operation-program creating section 312 may be realized by a hardware circuit. CAD data of the workpiece WK and the operation program created by the operation-program creating section 312 are stored in the memory 320. "CAD" means, as specified in JIS B3401, design advanced by creating, on the inside of a computer, a model formed by the shape of a product and other attribute data and analyzing and processing the model. "CAD data" means data created by such a design. The operation program is transferred to the control device 200 and stored. The control device 200 executes control of the robot 100 according to the operation program. The processor 310 is equivalent to the "control section" according to the present disclosure.

Figure 3:
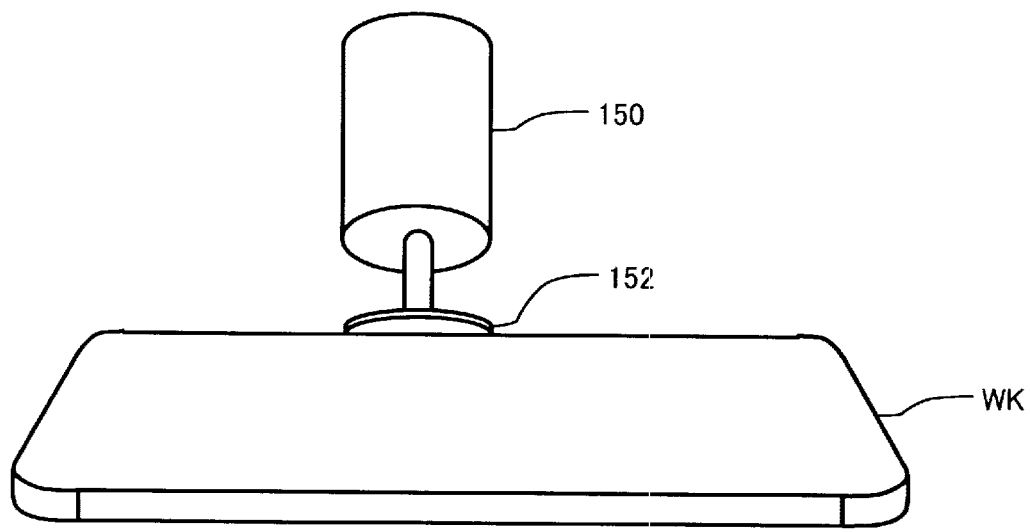
FIG. 3 is an explanatory diagram showing a state of workpiece polishing work.
Figure 4:
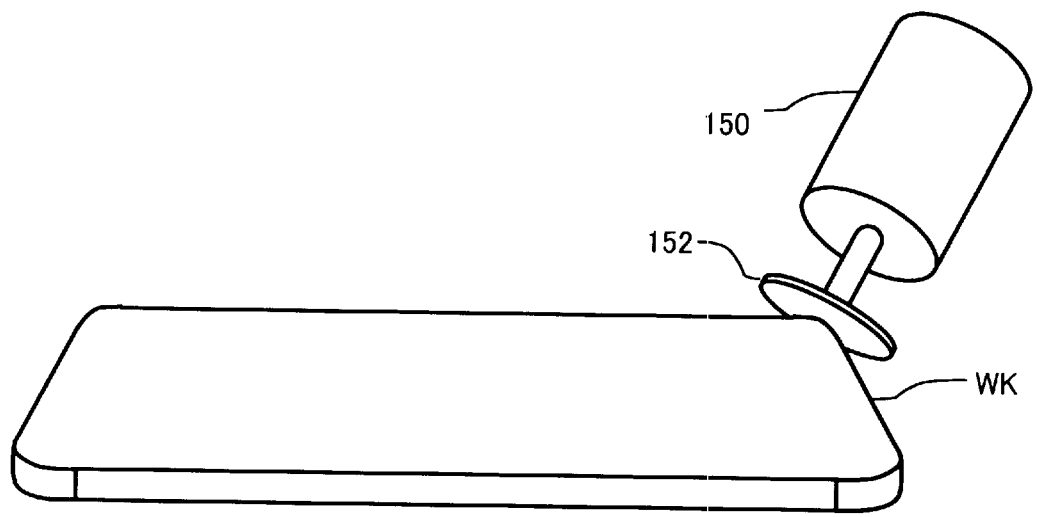
FIG. 4 is an explanatory diagram showing the state of the workpiece polishing work.

FIG. 3 shows a state in which a linear portion of one side of the workpiece WK is polished. FIG. 4 shows a state in which a curved portion of the workpiece WK is polished. In FIGS. 3 and 4, shapes of the polished portions are different. A contact area of the workpiece WK and the rotating body 152 fluctuates according to the difference between the shapes. Usually, when a polishing operation is performed using force control, the rotating body 152 with the polishing material is pressed against the workpiece WK with a constant force to perform polishing. A polishing amount at this time is proportional to a contact pressure and a contact time. For example, when the polishing is performed with a constant pressing force and at constant moving speed, in a part where the contact area is large as shown in FIG. 3, the polishing amount is small because the contact pressure is small and, in a part where the contact area is small as shown in FIG. 4, the polishing amount is large because the contact pressure is large. In order to avoid such a deficiency and keep the polishing amount constant even if the shape of a polished part changes, it is preferable to adjust an operation value to further reduce the pressing force or further increase the moving speed of the rotating body 152 in a part where the contact area is smaller. Alternatively, the rotating speed of the rotating body 152 may be further reduced in a part where the contact area is small. In order to realize such adjustments, in this embodiment, as explained below, a plurality of teaching points are classified into teaching point groups and operation values concerning work involved in force control are set for each of the teaching point groups.

Figure 5:
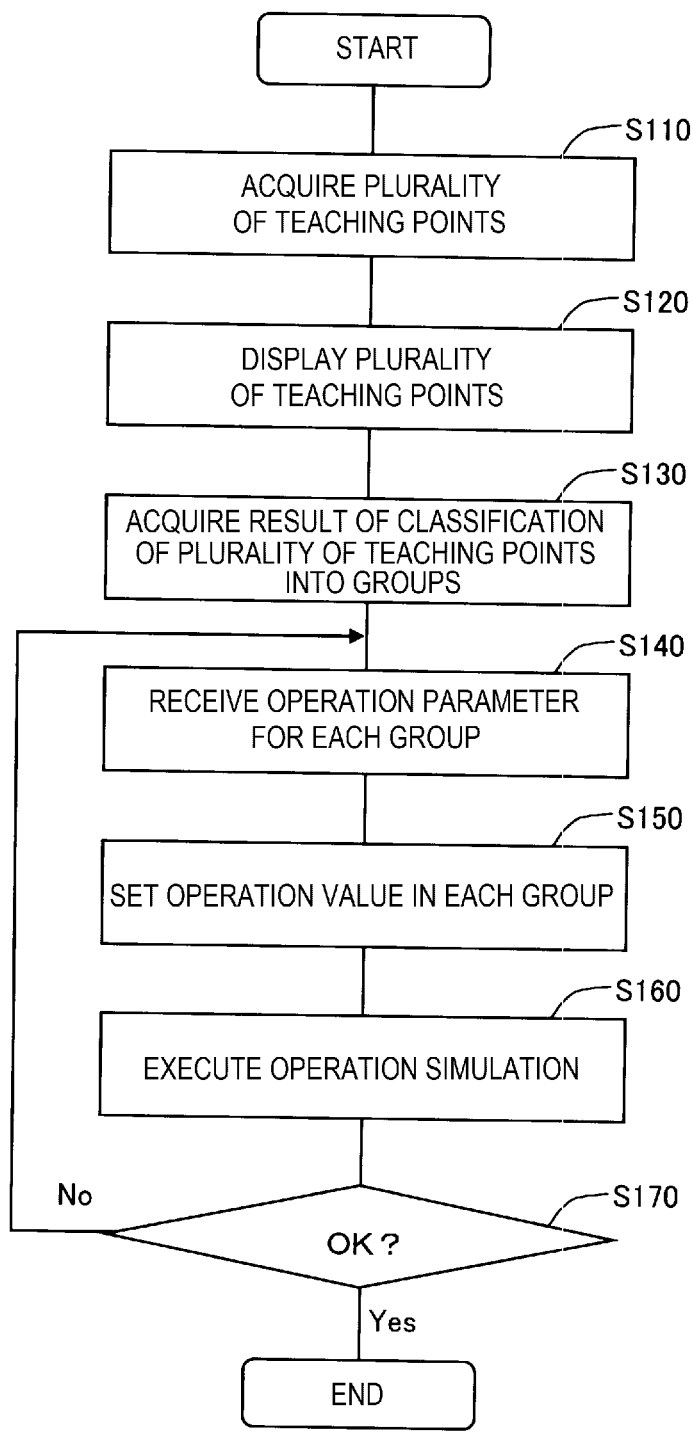
FIG. 5 is a flowchart showing a procedure for setting teaching point groups and operation values.

FIG. 5 is a flowchart showing a procedure for setting classification of teaching point groups and operation values for each teaching point group. Processing shown in FIG. 5 is a part of teaching processing executed by the operation-program creating section 312 when creating an operation program. A method of controlling the processing shown in FIG. 5 is referred to as "teaching control method" as well.

In step S110, the operation-program creating section 312 acquires a plurality of teaching points. In step S120, the operation-program creating section 312 displays the acquired plurality of teaching points on the display section 350. As a method of acquiring a teaching point, there are mainly two methods. A first acquiring method is a method of acquiring, via the control device 200, a teaching point input using the teaching pendant 400. As the first acquiring method, a method of acquiring a plurality of teaching points through direct teaching can also be used. The direct teaching is a method in which the operator moves the arm 110 to thereby teach the operation of the arm 110. A second acquiring method is a method of acquiring a coordinate point of CAD data of the workpiece WK as a teaching point. Specifically, for example, a plurality of coordinate points included in the CAD data are displayed on a screen. The operator can acquire a plurality of teaching points by selecting any coordinate points among the plurality of coordinate points. In this embodiment, a method of acquiring a plurality of teaching points from the CAD data of the workpiece WK is used. When acquiring the teaching point, it is preferable to simultaneously acquire an initial value of an operation value. The initial value of the operation value is input using the teaching pendant 400 or the input device 340 of the personal computer 300.

Figure 6:
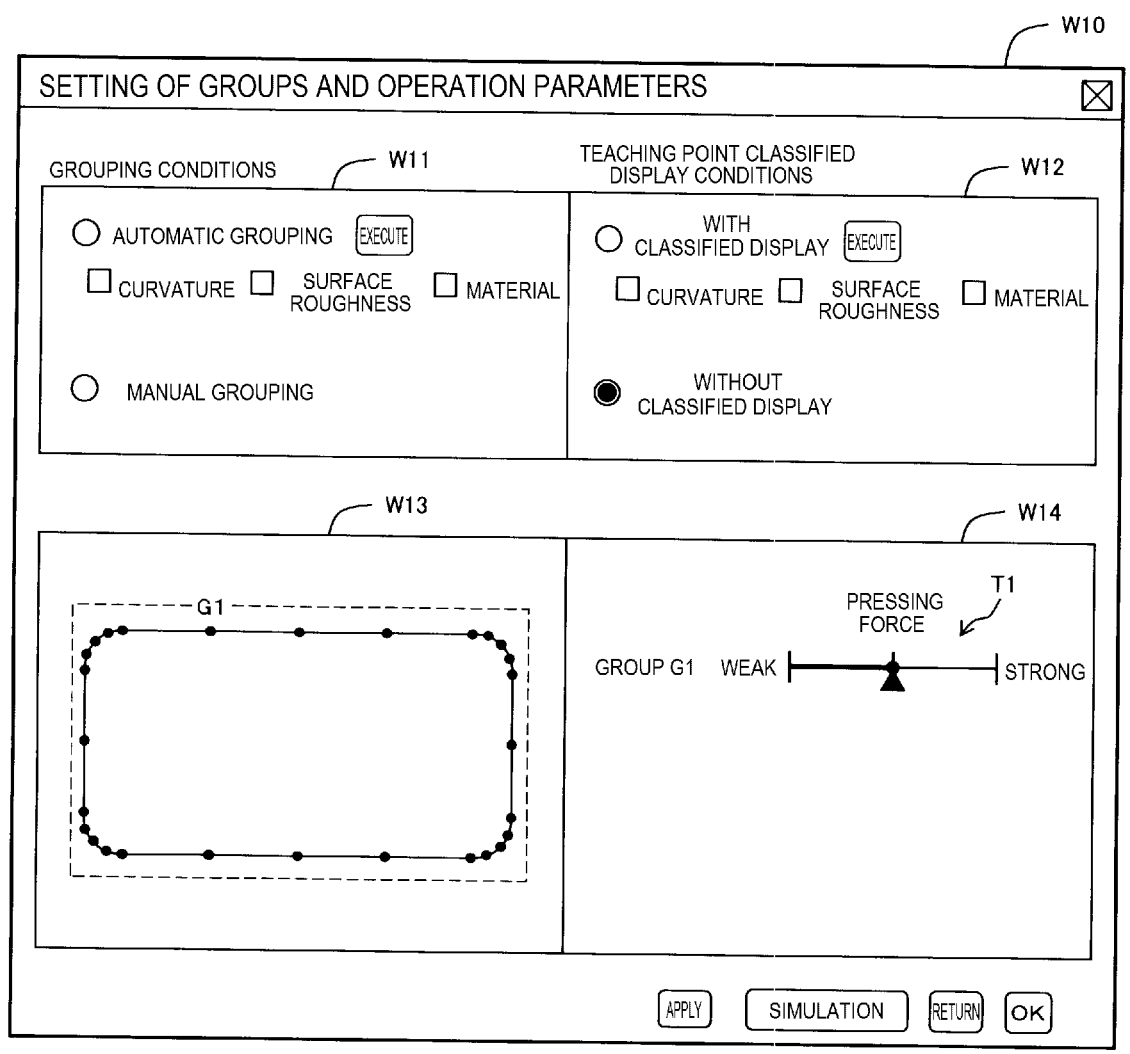
FIG. 6 is an explanatory diagram showing a state of setting teaching point groups and operation values.

FIG. 6 shows an example of a window W10 displayed on the display section 350 in step S120. The window W10 includes a grouping condition setting region W11, a display condition setting region W12, a grouping region W13, and a parameter setting region W14.

(1) Grouping Condition Setting Region W11

The grouping condition setting region W11 is used to set conditions for classifying a plurality of teaching points into one or more groups. In this disclosure, the term "group" means a teaching point group. In the example shown in FIG. 6, "automatic grouping" or "manual grouping" can be selected as a grouping method. When the operator selects the "automatic groping", as grouping conditions, one or more conditions among a plurality of conditions including "curvature", "surface roughness", and "material" can be selected. The "curvature" means a curvature of the surface of the workpiece WK. These plurality of conditions are attribute information of the workpiece WK obtained from the CAD data of the workpiece WK. For example, as a curvature at a certain teaching point, a curvature of the surface at the teaching point can be acquired from the CAD data. When the curvature of the surface is not included in the CAD data, a curvature may be calculated from the radius of a circle defined by three continuous teaching points centering on the teaching point. In the latter case, since the curvature is calculated using teaching points selected from coordinate points of the CAD data, the curvature is equivalent to "attribute information of the workpiece WK obtained from the CAD data". The attribute information of the workpiece WK is referred to as "characteristic information" as well. The attribute information of the workpiece WK that can be used as the grouping conditions preferably includes at least one of a curvature, surface roughness, and a material. Attribute information other than the attribute information may be able to be used.

(2) Display Condition Setting Region W12

The display condition setting region W12 is used to classify a plurality of teaching points and visually distinguishably display the plurality of teaching points. In the example shown in FIG. 6, "with classified display" or "without classified display" can be selected as a classified display method for teaching points. When the "with classified display" is selected, one or more conditions among a plurality of conditions including "curvature", "surface roughness", and "material" can be used as classification conditions. As the classification conditions, the same conditions as the grouping conditions in the grouping condition setting region W11 can be used. For example, when the operator selects the "material" and presses an "execute" button in the display condition setting region W12, a plurality of teaching points are visually distinguishably displayed according to the material of the workpiece WK in the positions of the teaching points. However, in FIG. 6, a state of the "without classified display" is shown. The display condition setting region W12 may be omitted.

(3) Grouping Region W13

The grouping region W13 is used to classify a plurality of teaching points into teaching point groups. As shown in FIG. 6, at a point in time of step S120, the plurality of teaching points acquired in step S110 are classified as one group G1. When the plurality of teaching points represent a track of the vertical articulated robot, since the track is a three-dimensional track, the track is preferably displayed in three dimensions. In the grouping region W13, fine adjustment of the positions of the teaching points and deletion of inappropriate teaching points may be performed.

(4) Parameter Setting Region W14

The parameter setting region W14 includes a setting tool T1 for setting an operation parameter for each group. The operation parameter is a parameter used to set an operation value of the robot 100 such as force or speed. The operation parameter set by the setting tool T1 is a parameter concerning a "pressing force", which is a kind of an operation value concerning force control. In the example shown in FIG. 6, the setting tool T1 is formed as a slider. However, tools of other kinds such as a field for inputting a numerical value and a pulldown menu for selecting one out of a plurality of candidate values may be used. If the slider is used, there is an advantage that the operator can easily visually understand the operation parameter.

The setting tool T1 may be a tool for designating the absolute value of an operation value or may be a tool for designating an increase or a decrease of the operation value from a present value. In the latter case, the center of the setting tool T1 means that the present value of the operation value is not changed. The right side of the center means that the operation value is set to a value larger than the present value. The left side of the center means that the operation value is set to a value smaller than the present value. At this time, the operation parameter is set as, for example, a difference from the present value of the operation value or a coefficient for multiplying the present value.

In the parameter setting region W14, as the operation parameter concerning the force control, besides the operation parameter of the pressing force, an operation parameter such as the number of revolutions of the rotating body 152, the moving speed of the rotating body 152, or the number of times of polishing may be set. As it is understood from these examples, the operation parameter concerning the force control is a parameter for specifying a work condition for work involving the force control.

In step S130, the plurality of teaching points are classified into one or more groups. The operation-program creating section 312 acquires a result of the classification. In step S130, first, the plurality of teaching points can be classified and visually distinguishably displayed using the setting of the display condition setting region W12 explained with reference to FIG. 6.

Figure 7:
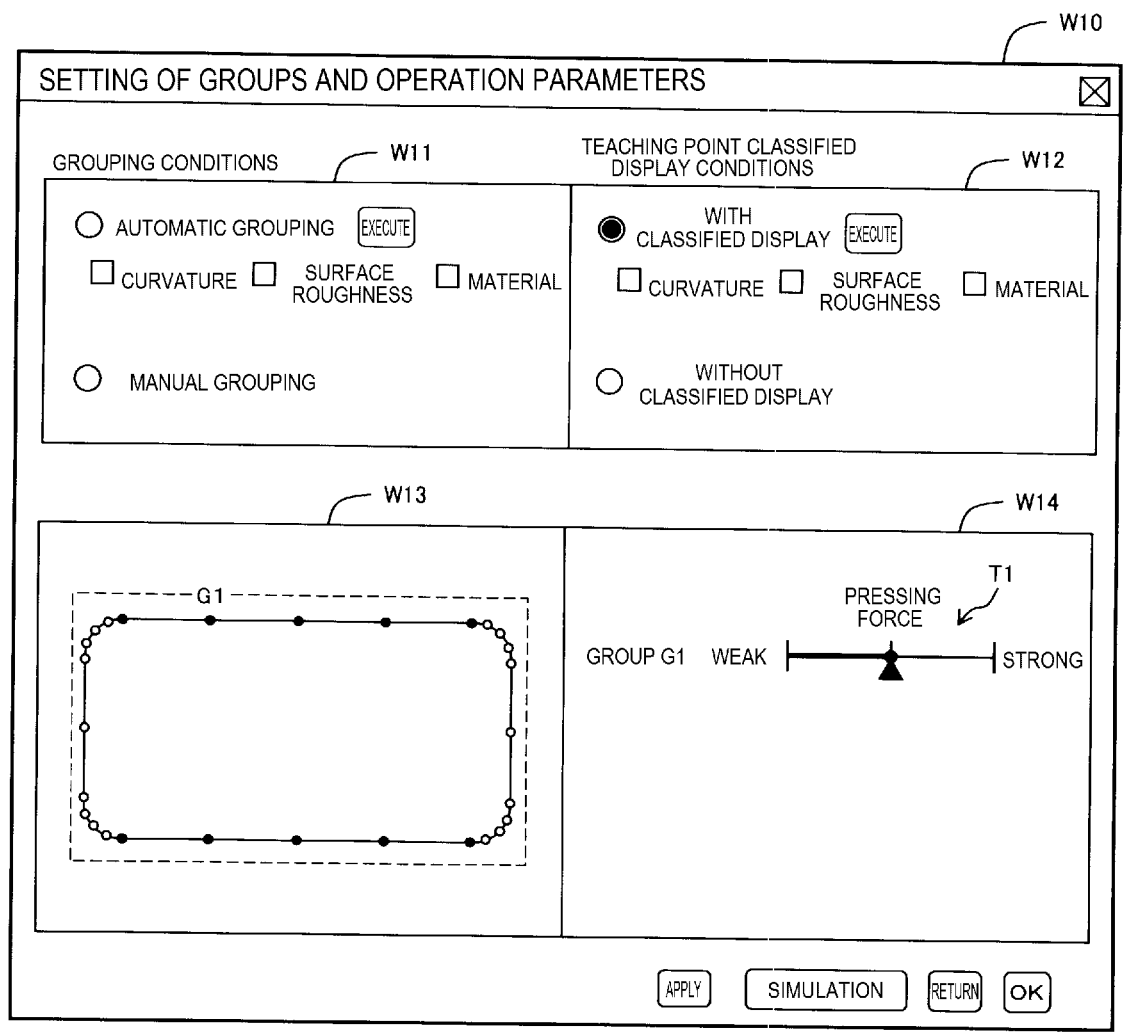
FIG. 7 is an explanatory diagram showing a state in which teaching points are classified and displayed.

FIG. 7 shows a state in which the "with classified display" and the "material" are selected in the display condition setting region W12 and a plurality of teaching points are visually distinguishably displayed in the groping region W13. In FIG. 7, for example, black circle teaching points are present in the positions of metal components and white circle teaching points are present in the positions of resin components. If the plurality of teaching points are classified and visually distinguishably displayed according to attribute information of the workpiece WK in this way, the operator can more easily perform grouping of the teaching points in the grouping region W13. However, such classified display may not be performed.

As the method of classifying the teaching points into groups in step S130, the "automatic grouping" or the "manual grouping" can be selected in the grouping condition setting region W11 as explained above. For example, when the operator selects the "automatic grouping" and the "curvature" and presses the "execute" button, the plurality of teaching points are automatically classified into one or more groups according to curvatures of the teaching points on the track. A result of the classification is displayed in the grouping region W13.

Figure 8:
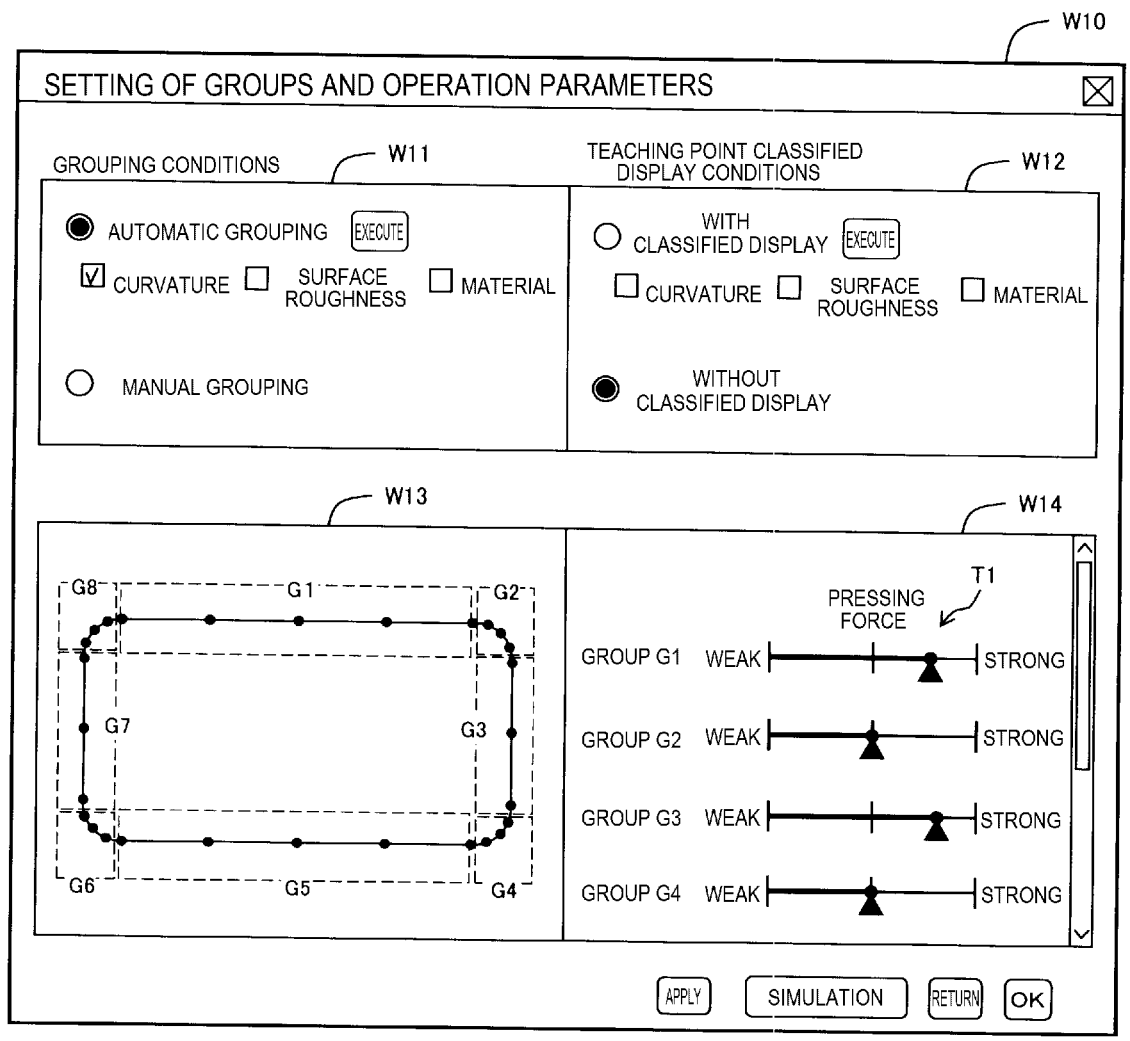
FIG. 8 is an explanatory diagram showing an example of a classification result of teaching point groups.

FIG. 8 is an explanatory diagram showing a state in which a plurality of teaching points are classified into eight groups G1 to G8 according to the "curvature". A frame surrounding each group and an identification sign of each group are preferably displayed in the grouping region W13. All of the plurality of teaching points displayed in the grouping region W13 are preferably classified into any groups.

When the operator selects the "manual grouping", the operator manually classifies the plurality of teaching points in the grouping region W13 into one or more groups. As a method of the classification, various methods can be used. For example, a first method is a method of selecting a plurality of teaching points with mouse click or touch operation. A second method is a method of selecting a plurality of teaching points by encircling a region including the plurality of teaching points. A third method is a method of selecting a start point and an end point of a plurality of teaching points to thereby select teaching points between the start point and the end point. Executing the manual grouping in a state in which the plurality of teaching points in the grouping region W13 are visually distinguishably displayed according to the attribute information of the workpiece WK is equivalent to "executing classification processing into groups using the attribute information of the workpiece WK at the plurality of teaching points" as in the automatic grouping.

In step S130, the plurality of teaching points are classified into one or more groups. However, the number of groups is preferably set to two or more. At least one group preferably includes three or more teaching points. This is because, if groups are classified to include a larger number of teaching points, since the number of groups decreases, it is easier to perform setting work for an operation parameter for each group.

In step S140, the operator sets an operation parameter for each group and the operation-program creating section 312 receives the operation parameter.

In the parameter setting region W14 in FIG. 8 explained above, the setting tool T1 for an operation parameter for each group is displayed. The operator is capable of individually setting the operation parameter for each group. In the example shown in FIG. 8, an operation parameter of a pressing force for each group is set using the setting tool T1 of the slide bar. Other operation values are set in the same manner. When an "apply" button in the window W10 is pressed, the operation-program creating section 312 acquires a set classification of each group and an operation parameter for each group.

When a teaching point having a limited range in which operation values can be set is included in a certain group, a settable range of an operation parameter in the parameter setting region W14 is preferably displayed in a state in which the range is automatically changed to a changeable range. As an example of the range, for example, examples shown in FIGS. 9 and 10 explained below can be used.

Figure 9:
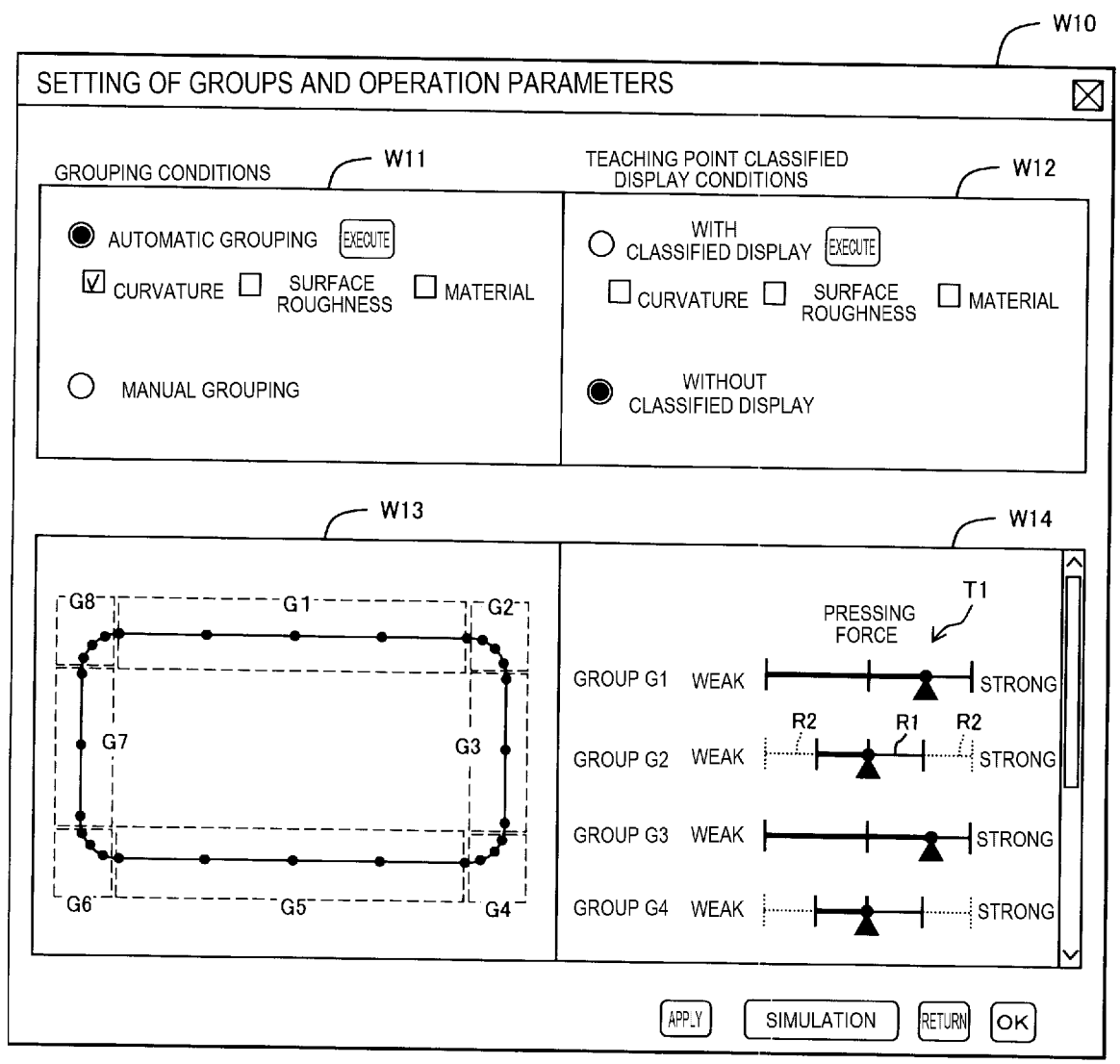
FIG. 9 is an explanatory diagram showing a modification example of FIG. 8 in the case in which operation values are limited.

FIG. 9 is an explanatory diagram showing a modification of FIG. 8 in the case in which operation values are limited. In this example, in the parameter setting region W14, an entire range of an operation parameter of a pressing force of the group G2 is visually distinguished as a settable range R1 and an un-settable ranges R2 and displayed. The same applies to the group G4. The operator can set the operation parameter of the pressing force only in the settable range R1.

The limitation of the operation values explained above often occurs according to curvatures at the teaching points belonging to each group. Therefore, a settable range of the setting tool T1 may be changed according to a curvature at a teaching point. Specifically, when the curvature at the teaching point is large, an operation parameter is limited to a small range. In this way, the settable range of the setting tool T1 can be appropriately changed according to the curvature formed by the teaching point.

Figure 10:
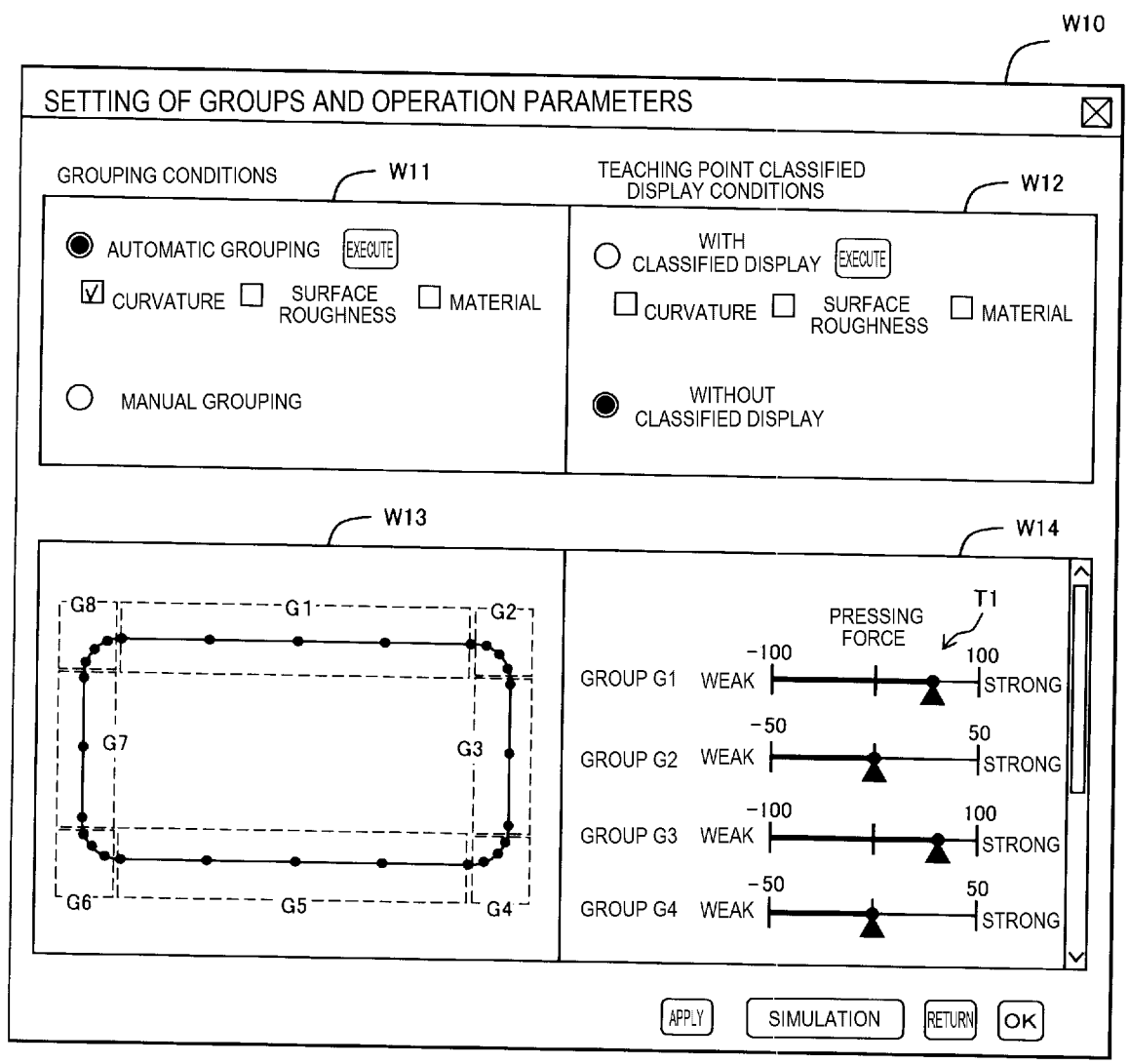
FIG. 10 is an explanatory diagram showing another modification of FIG. 8 in the case in which operation values are limited.

FIG. 10 is an explanatory diagram showing another modification of FIG. 8 in the case in which operation values are limited. In this example, in the parameter setting region W14, the size of the slider of the setting tool T1 of the group G2 is the same. However, an upper limit value and a lower limit value are changed such that the operator can recognize that the settable range of the setting tool T1 is a range narrower than a range of −100% to 100%, which is a normal entire range. The same applies to the group G4. The operator can set the operation parameter of the pressing force only in this narrow range.

If the settable range of the operation parameter is displayed in a range individually determined for each group as in the examples shown in FIGS. 9 and 10, the operation parameter can be easily set using a setting tool having a settable range suitable for each teaching point group. On the other hand, if the settable range of the operation parameter is displayed in the same range about all the groups as in the example shown in FIG. 8, the operation parameter can be easily set using a setting tool having a settable range common to each group.

In step S150, the operation-program creating section 312 sets an operation value for each group using the operation parameter set in step S140. When an operation parameter is set as a difference from a present value of an operation value or a coefficient for multiplying the present value as explained above, a new operation value is set for each teaching point belonging to each group using the operation parameter. On the other hand, when an operation parameter is set as the absolute value of an operation value, a value itself of the operation parameter is set as a new operation value.

All of operation values for each teaching point of a plurality of teaching points belonging to one group may be set to the same value or the operation values may be set to different values. In the latter case, a value of an operation value for each teaching point of the plurality of teaching points belonging to one group may be changed according to the position of the teaching point in the group. Specifically, a value of an operation value for a teaching point may be changed according to a curvature of the surface of the workpiece WK at the teaching point. For example, in the case of a teaching point present in a flat portion of the workpiece WK, a curvature at the teaching point is 0. A value of an operation value for the teaching point can be set to a value equal to an operation value corresponding to the operation parameter set in step S140. On the other hand, in the case of a teaching point present in a curved surface portion of the workpiece WK, a curvature at the teaching point is a value larger than 0. A value of an operation value for the teaching point can be set to a value smaller than the operation value corresponding to the operation parameter set in step S140. In this way, an appropriate operation value corresponding to a curvature of the surface of the workpiece WK can be set. For example, in the case of polishing work, a polishing amount at each teaching point can be brought close to a fixed value.

When step S150 ends, the operation-program creating section 312 creates an operation program according to the conditions set up to step S150 and stores the operation program in the memory 320.

In step S160, the operation-program creating section 312 executes an operation simulation of the robot 100 according to the operation program. The operation simulation is started by the operator pressing a "simulation" button in the window W10.

In step S170, the operator observes the operation simulation performed in step S160 and determines whether the setting of the operation value is appropriate. When the setting of the operation value is inappropriate, the processing returns to step S140 and the operator changes the operation parameter for each group according to necessity. The operation-program creating section 312 acquires the changed operation parameter and executes steps S150 to S170 again. When it is confirmed that the setting of the operation value is appropriate, the processing shown in FIG. 5 is ended.

As explained above, in the first embodiment, operation values can be set for each group of teaching points. Therefore, it is possible to easily perform teaching work. If attribute information of the workpiece WK at a plurality of teaching points is acquired from CAD data and grouping of the teaching points is executed using the attribute information, the grouping of the teaching points can be easily performed.

In the first embodiment, the example is explained in which the polishing is performed by pressing the rotating body 152 with a polishing agent against the workpiece WK. Instead, the workpiece WK may be pressed against a polishing device in a state in which the robot 100 grips the workpiece WK. The work involving the force control is applicable to work other than the polishing as well. As the other work involving the force control, there are component assembly work and the like. In the work involving the force control, it is preferable to use at least force used for the force control as a movement parameter set for each group of teaching points.

B. Second Embodiment

Figure 11:
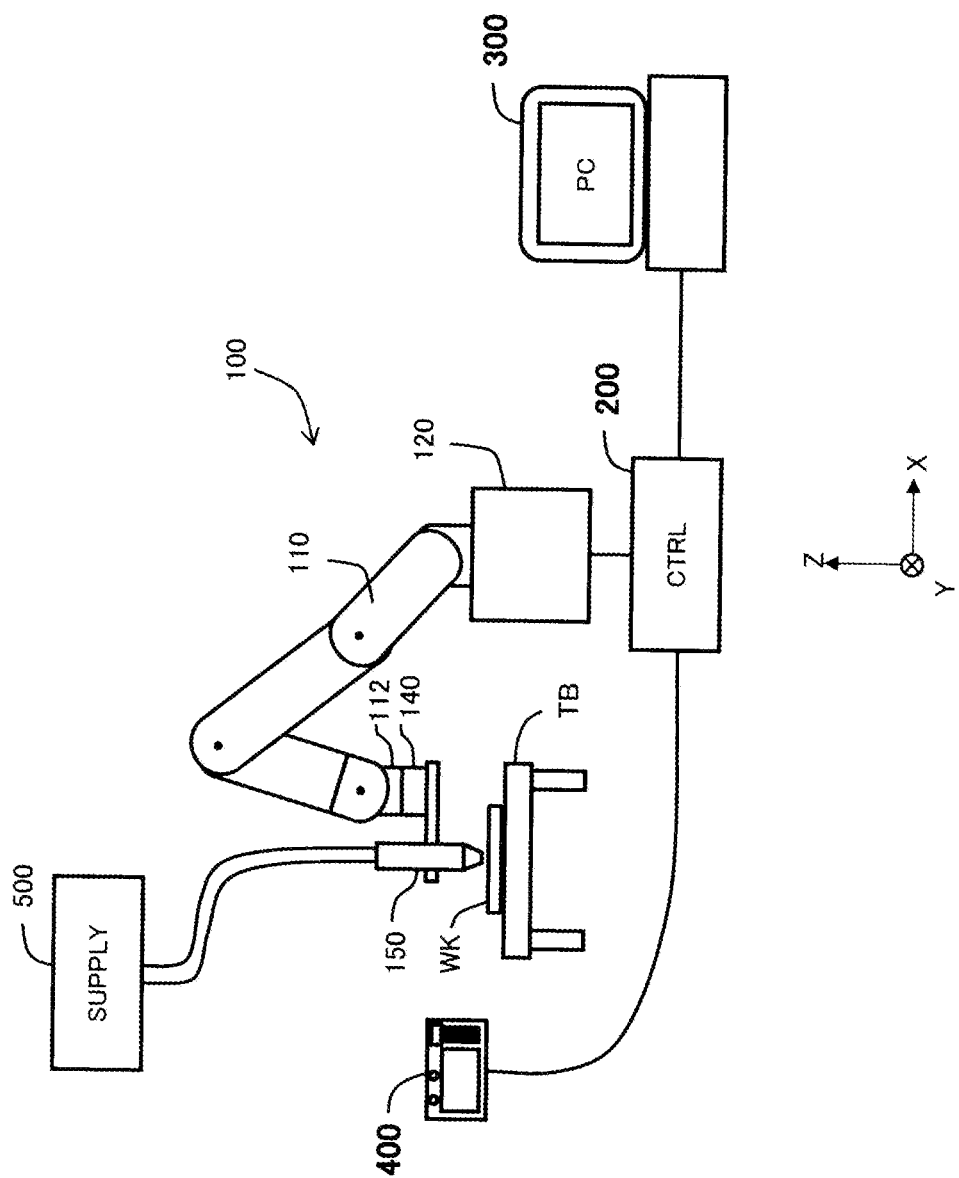
FIG. 11 is an explanatory diagram showing the configuration of a robot system in a second embodiment.

FIG. 11 is an explanatory diagram showing the configuration of a robot system in a second embodiment. The robot system in the second embodiment is different from the robot system in the first embodiment in that a dispenser for applying coating liquid to the workpiece WK is used as the end effector 150. The other components are substantially the same as the components in the first embodiment. The coating liquid is supplied to the end effector 150 from a coating liquid supply device 500. As the coating liquid, for example, an adhesive, a sealing agent, a silver paste, and the like can be used. The control device 200 performs discharge control to cause the dispenser to discharge the coating liquid. Specifically, the control device 200 causes the dispenser to discharge the coating liquid by supplying a discharge command to the coating liquid supply device 500 and the dispenser according to an operation program. The dispenser is preferably configured to be able to adjust an application pressure, which is pressure in discharging the coating liquid, according to a command from the control device 200.

Figure 12:
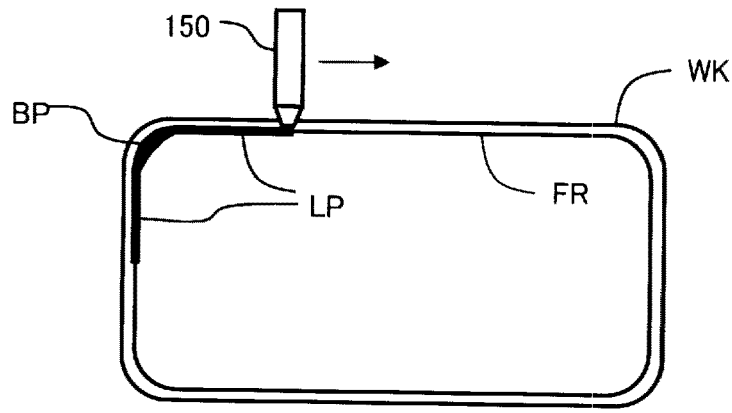
FIG. 12 is an explanatory diagram showing a state of application of coating liquid.

FIG. 12 is an explanatory diagram showing a state of application of the coating liquid. In this example, work for applying the coating liquid from the end effector 150 is executed along an inner frame FR of the workpiece WK. The coating liquid is, for example, an adhesive. The inner frame FR includes a linear portion LP and a curved portion BP. If application is executed at the same application pressure in the linear portion LP and the curved portion BP, as in an example shown in FIG. 12, in the curved portion BP, the coating liquid tends to be pulled to the inner side by surface tension and increase in width. Therefore, in the curved portion BP, it is preferable to make it possible to apply an appropriate amount of the coating liquid by setting an application pressure lower than an application pressure in the linear portion LP and reducing an application amount.

Figure 13:
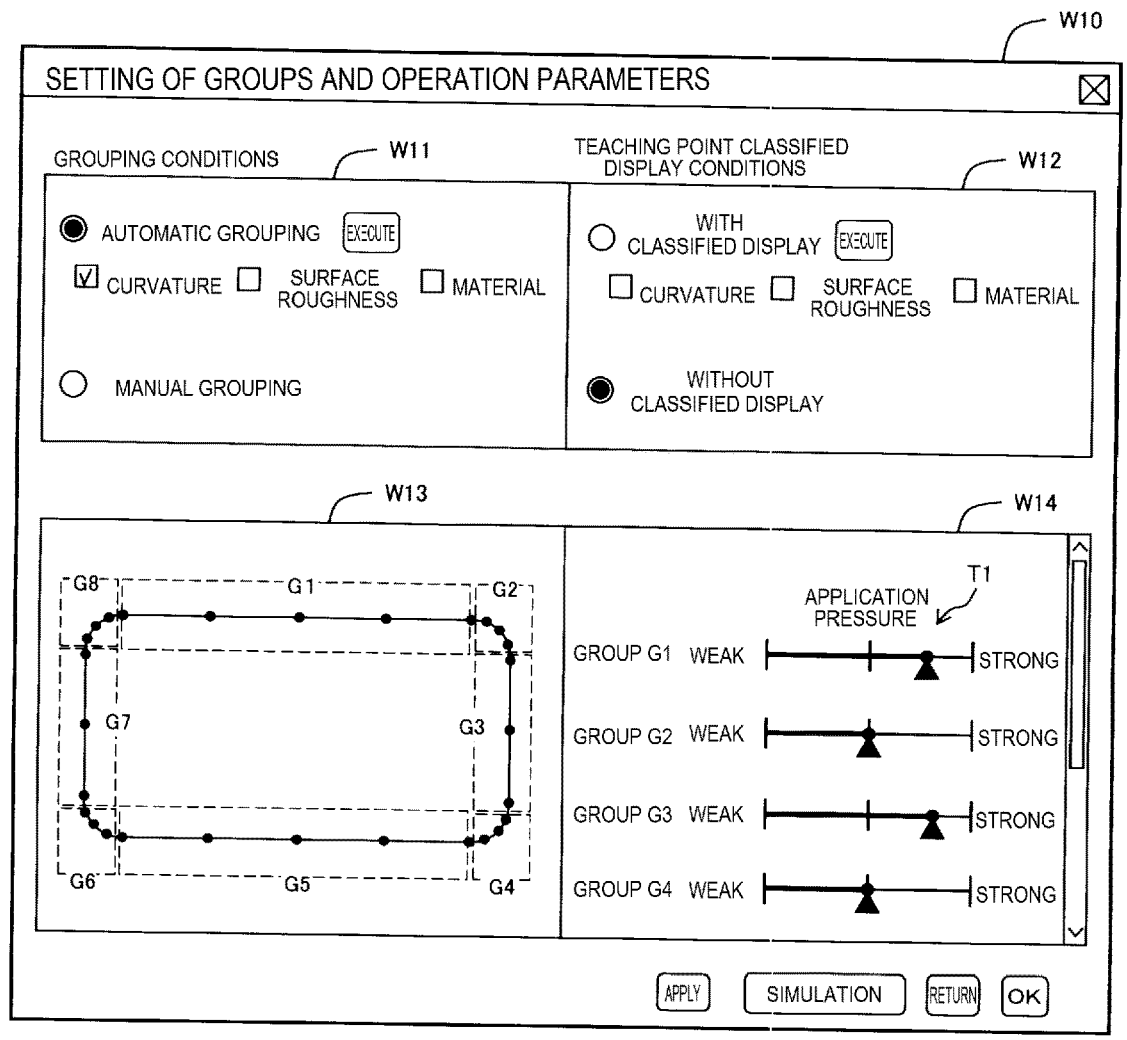
FIG. 13 is an explanatory diagram showing an example of a classification result of teaching point groups in the second embodiment.

FIG. 13 is an explanatory diagram showing an example of a classification result of teaching point groups in the second embodiment. FIG. 13 corresponds to FIG. 8 in the first embodiment. In FIG. 13, "application pressure" is used instead of the "pressing force" as an operation value set in the parameter setting region W14. The other components are the same as the components shown in FIG. 8.

In the second embodiment, substantially the same effects as the effects in the first embodiment are achieved. The various configurations and modifications explained in the first embodiment are also applicable to the second embodiment.

C. Third Embodiment

Figure 14:
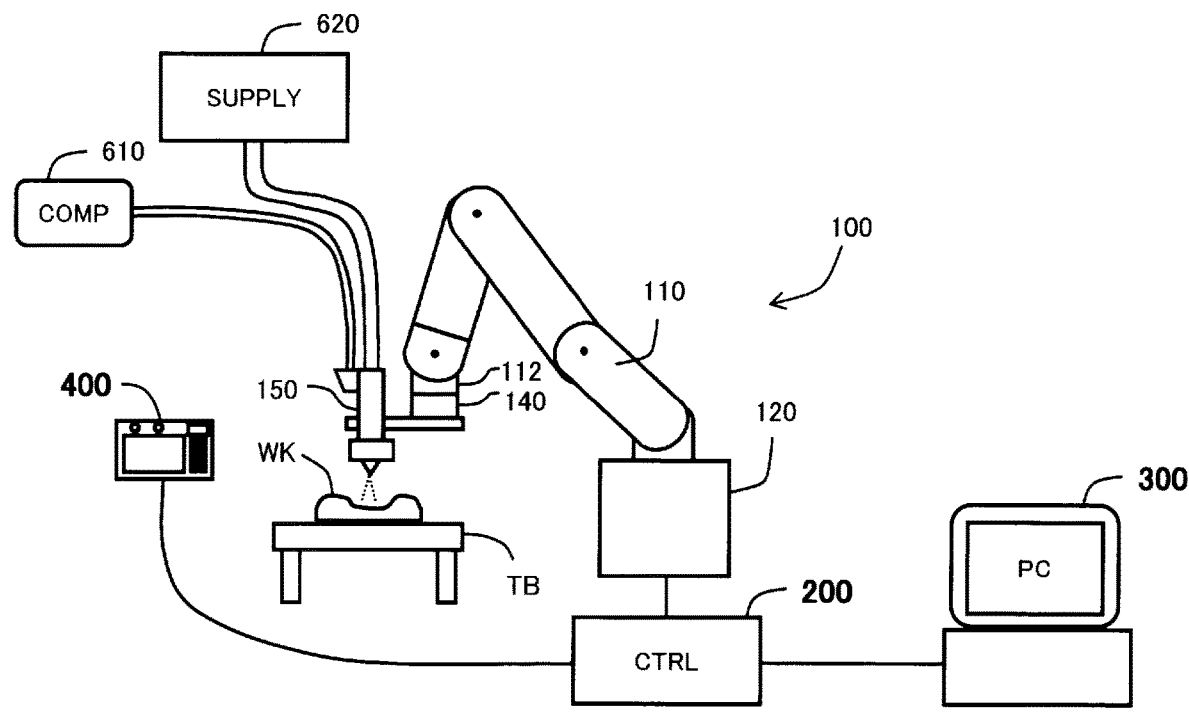
FIG. 14 is an explanatory diagram showing the configuration of a robot system in a third embodiment.

FIG. 14 is an explanatory diagram showing the configuration of a robot system in a third embodiment. The robot system in the third embodiment is different from the robot system in the first embodiment in that a spray gun for spraying and applying paint is used as the end effector 150. The other components are substantially the same as the components in the first embodiment. However, as the workpiece WK, an object having unevenness on the surface is used. Compressed air is supplied to the end effector 150 from an air compressor 610. The paint is supplied to the end effector 150 from a paint supply device 620. The control device 200 performs spray control to cause the spray gun to execute spray coating. Specifically, the control device 200 causes the spray gun to discharge coating liquid by supplying a coating command to the air compressor 610, the paint supply device 620, and the spray gun according to an operation program. The spray gun is preferably configured to be able to adjust a coating pressure, which is pressure in spraying the paint, according to a command from the control device 200.

Figure 15:
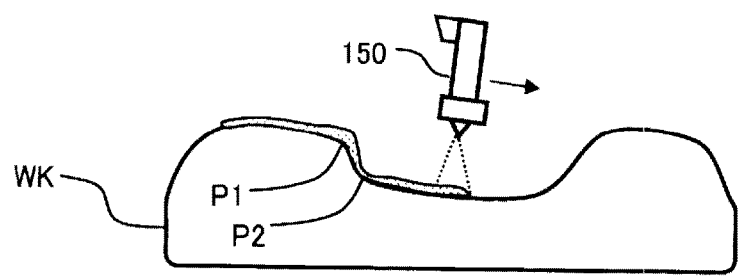
FIG. 15 is an explanatory diagram showing a state of spray coating.

FIG. 15 is an explanatory diagram showing a state of spray coating. In this example, work for spraying and coating the paint from the end effector 150 is executed along the unevenness on the surface of the workpiece WK. In the spray coating, the paint is applied from a position a fixed distance apart from the surface of the workpiece WK. If the spray coating is executed at the same coating pressure in a convex surface portion P1 and a concave surface portion P2 of the workpiece WK, as in the example shown in FIG. 15, a coating film tends to be thick in the convex surface portion P1 and tends to be thin in the concave surface portion P2. Therefore, it is preferable to make it possible to spray and coat an appropriate amount of the paint by setting the coating pressure lower in the convex surface portion P1 than in the concave surface portion P2.

Figure 16:
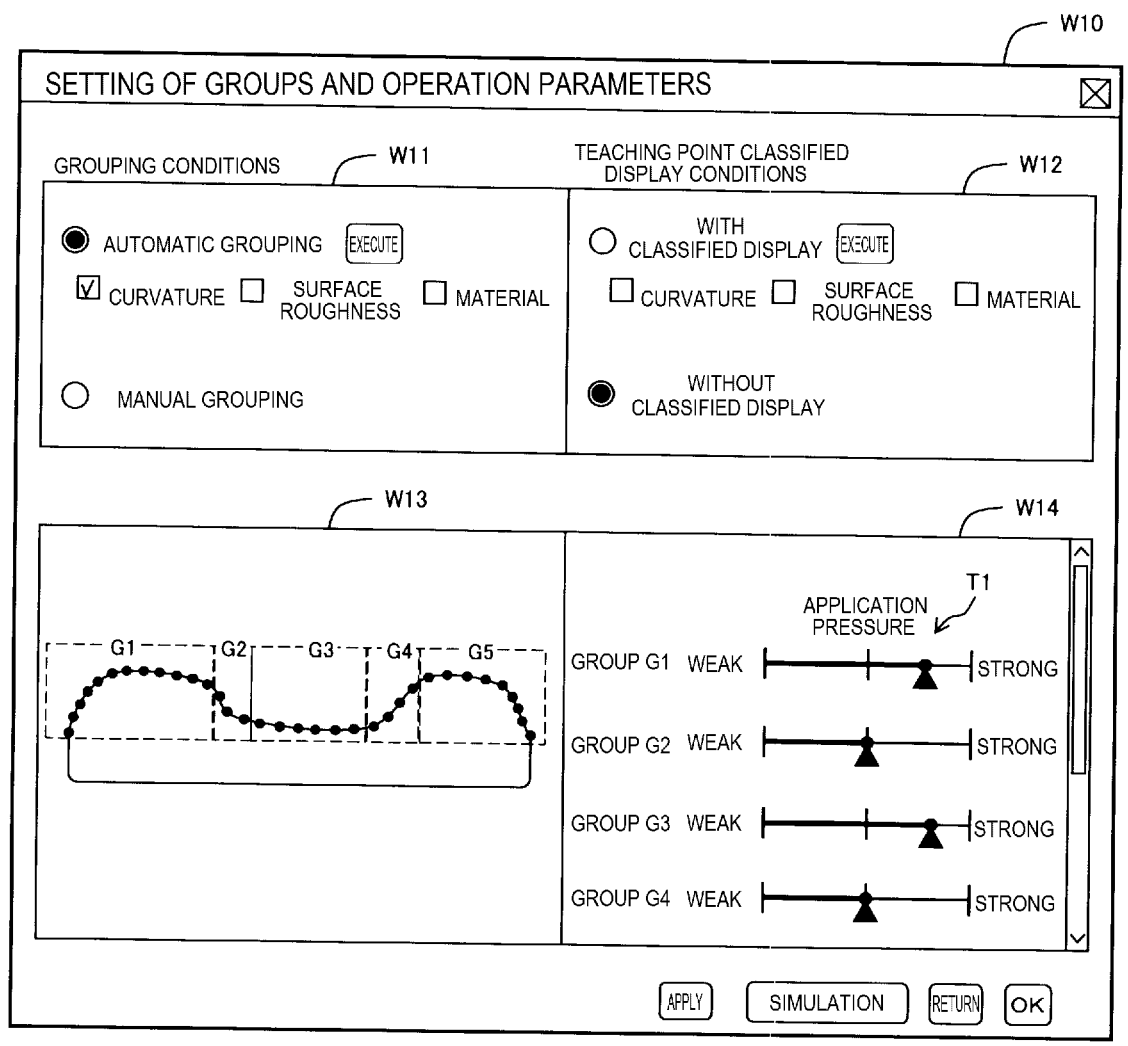
FIG. 16 is an explanatory diagram showing an example of a classification result of teaching point groups in the third embodiment.

FIG. 16 is an explanatory diagram showing an example of a classification result of teaching point groups in the third embodiment. FIG. 16 corresponds to FIG. 8 in the first embodiment. In FIG. 16, "coating pressure" is used instead of the "pressing force" as an operation value set in the parameter setting region W14. The other components are the same as the components shown in FIG. 8.

In the third embodiment, substantially the same effects as the effects in the first embodiment are achieved. The various configurations and modifications explained in the first embodiment are also applicable to the third embodiment.

Other Embodiments

The present disclosure is not limited to the embodiments explained above and can be realized by various aspects without departing from the gist of the present disclosure. For example, the present disclosure can be realized by aspects explained below. Technical features in the embodiments explained above corresponding to technical features in the aspects explained below can be replaced or combined as appropriate in order to solve a part or all of the problems of the present disclosure or in order to achieve a part or all of the effects of the present disclosure. If the technical features are not explained as essential technical features in this specification, the technical features can be deleted as appropriate.

(1) According to a first aspect of the present disclosure, there is provided a teaching control method for creating an operation program for a robot that executes work for a work target object. The teaching control method includes: (a) acquiring a plurality of teaching points from CAD data of the work target object; (b) displaying the plurality of teaching points on a display section; (c) acquiring a result of classification processing for classifying the plurality of teaching points into one or more teaching point groups; (d) receiving an operation parameter used to set an operation value for each teaching point group among the one or more teaching point groups; and (e) setting the operation value for each teaching point group using the operation parameter. (c) The acquiring of the result of the classification processing includes: (i) acquiring attribute information of the work target object acquired from the CAD data, the attribute information being attribute information at the plurality of teaching points; and (ii) executing the classification processing using the attribute information.

With this teaching control method, it is possible to set the operation value for each teaching point group. Therefore, it is possible to easily perform teaching work. Further, it is possible to easily perform, using the attribute information of the work target object at the plurality of teaching points, the processing for classifying the teaching points into the teaching point groups.

(2) In the teaching control method, the operation value may be a force used in force control.

With the teaching control method, it is possible to easily set the force used in the force control.

(3) In the teaching control method, the attribute information may include at least one of a curvature of a surface of the work target object, surface roughness, and a material of the surface.

With the teaching control method, it is possible to easily classify the teaching points using the attribute information of the work target object such as the curvature of the surface.

(4) In the teaching control method, the attribute information may include the curvature of the surface, and (e) the setting of the operation value may include changing the operation value at each teaching point according to the curvature of the surface at each teaching point among the teaching point groups.

With the teaching control method, it is possible to set an appropriate operation value corresponding to the curvature of the surface of the work target object.

(5) In the teaching control method, (c) the acquiring of the result of the classification processing may include, after (i) the acquiring of the attribute information, classifying and visually distinguishably displaying the plurality of teaching points according to the attribute information.

With the teaching control method, since the plurality of teaching points are visually distinguishably displayed according to the attribute information, it is possible to easily perform classification work into the teaching point groups.

(6) According to a second aspect of the present disclosure, there is provided a robot system. The robot system includes: a robot configured to execute work for a work target object; a control section configured to control the robot; and a display section coupled to the control section. The control section executes: (a) processing for acquiring a plurality of teaching points from CAD data of the work target object; (b) processing for displaying the plurality of teaching points on the display section; (c) processing for executing processing for acquiring a result of classification processing for classifying the plurality of teaching points into one or more teaching point groups; (d) processing for acquiring an operation parameter used to set an operation value for each teaching point group among the one or more teaching point groups; and (e) processing for setting the operation value for each teaching point group using the operation parameter. The processing (c) includes: (i) processing for acquiring attribute information of the work target object acquired from the CAD data, the attribute information being attribute information at the plurality of teaching points; and (ii) processing for executing the classification processing using the attribute information.

With the robot system, it is possible to set the operation value for each teaching point group. Therefore, it is possible to easily perform teaching work. Further, it is possible to easily perform, using the attribute information of the work target object at the plurality of teaching points, the processing for classifying the teaching points into the teaching point groups.

(7) According to a third aspect of the present disclosure, there is provided a non-transitory computer-readable storage medium storing a computer program for causing a processor to execute teaching control for a robot that executes work for a work target object. The computer program causes the processor to execute: (a) processing for acquiring a plurality of teaching points from CAD data of the work target object; (b) processing for displaying the plurality of teaching points on a display section; (c) processing for executing processing for acquiring a result of classification processing for classifying the plurality of teaching points into one or more teaching point groups; (d) processing for acquiring an operation parameter used to set an operation value for each teaching point group among the one or more teaching point groups; and (e) processing for setting the operation value for each teaching point group using the operation parameter. The processing (c) includes: (i) processing for acquiring attribute information of the work target object acquired from the CAD data, the attribute information being attribute information at the plurality of teaching points; and (ii) processing for executing the classification processing using the attribute information.

With the non-transitory computer-readable storage medium storing the computer program, it is possible to set the operation value for each teaching point group. Therefore, it is possible to easily perform teaching work. Further, it is possible to easily perform, using the attribute information of the work target object at the plurality of teaching points, the processing for classifying the teaching points into the teaching point groups.

The present disclosure can also be realized in various aspects other than the aspects explained above. The present disclosure can be realized in aspects such as a robot system including a robot and a robot control device, a computer program for realizing functions of the robot control device, and a non-transitory storage medium recording the computer program.

What is claimed is:

1. A teaching control method for creating an operation program for a robot that executes work for a work target object, the teaching control method comprising:
    (a) acquiring a plurality of teaching points from CAD data of the work target object;
    (b) displaying the plurality of teaching points on a display section;
    (c) acquiring a result of classification processing for classifying the plurality of teaching points into one or more teaching point groups;
    (d) receiving an operation parameter used to set an operation value for each teaching point group among the one or more teaching point groups; and
    (e) setting the operation value for each teaching point group using the operation parameter, wherein
    (c) the acquiring of the result of the classification processing includes:
        (i) acquiring attribute information of the work target object acquired from the CAD data, the attribute information being attribute information at the plurality of teaching points, wherein the attribute information includes at least one of a curvature of a surface of the work target object, surface roughness, and a material of the surface; and
        (ii) executing the classification processing using the attribute information.

2. The teaching control method according to claim 1, wherein the operation value is a force used in force control.

3. The teaching control method according to claim 1, wherein
    the attribute information includes the curvature of the surface, and
    (e) the setting of the operation value includes changing the operation value at each teaching point according to the curvature of the surface at each teaching point among the teaching point groups.

4. The teaching control method according to claim 1, wherein (c) the acquiring of the result of the classification processing includes, after (i) the acquiring of the attribute information, classifying and visually distinguishably displaying the plurality of teaching points according to the attribute information.

5. A robot system comprising:
    a robot configured to execute work for a work target object;
    a control section configured to control the robot; and
    a display section coupled to the control section, wherein the control section executes:
        (a) processing for acquiring a plurality of teaching points from CAD data of the work target object;
        (b) processing for displaying the plurality of teaching points on the display section;
        (c) processing for executing processing for acquiring a result of classification processing for classifying the plurality of teaching points into one or more teaching point groups;
        (d) processing for acquiring an operation parameter used to set an operation value for each teaching point group among the one or more teaching point groups; and
        (e) processing for setting the operation value for each teaching point group using the operation parameter, and
    the processing (c) includes:
        (i) processing for acquiring attribute information of the work target object acquired from the CAD data, the attribute information being attribute information at the plurality of teaching points, wherein the attribute information includes at least one of a curvature of a surface of the work target object, surface roughness, and a material of the surface; and
        (ii) processing for executing the classification processing using the attribute information.

* * * * *